United States Patent [19]
Kehl

[11] 4,221,396
[45] Sep. 9, 1980

[54] WHEEL CHAIR RESTRAINT

[75] Inventor: Norman J. Kehl, Elk Grove Village, Ill.

[73] Assignee: Coach and Car Equipment Corporation, Elk Grove Village, Ill.

[21] Appl. No.: 29,628

[22] Filed: Apr. 13, 1979

[51] Int. Cl.[2] .......... B60P 7/00
[52] U.S. Cl. .......... 280/1; 188/2 F
[58] Field of Search .......... 105/463, 464; 280/179 R; 188/2 F; 248/119 R, 500, 503

[56] References Cited

U.S. PATENT DOCUMENTS 4,019,752 4/1977 Leon et al. .......... 280/179 R
4,113,270 9/1978 Barecki .......... 280/179 R

*Primary Examiner*—Richard A. Bertsch
*Attorney, Agent, or Firm*—Merriam, Marshall & Bicknell

[57] ABSTRACT

A wheelchair wheel is received and restrained in a device mounted on the support for a folding seat in a mass transit vehicle. The wheel is held in a restrained position by a pair of pivotal jaws normally urged to an open position but actuated to a closed position in response to the entry of a wheelchair wheel into the space between the open jaws. The jaws are opened to face the wheel by manipulation of a manually operated handle.

6 Claims, 9 Drawing Figures

WHEEL CHAIR RESTRAINT

BACKGROUND OF THE INVENTION

The present invention relates generally to devices for restraining the movement of wheels and more particularly to a device, installable on a mass-transit vehicle such as a bus, for restraining the movement of a wheelchair.

Large numbers of handicapped persons are confined to wheelchairs, and, if these persons are to rely for transportation upon mass-transit vehicles (busses, subway cars or the like), provision must be made in these vehicles to accommodate the wheelchairs. Stopping, starting, turning or lurching movements on the part of the vehicle could cause a wheelchair to move creating danger for the wheelchair occupant and the other passengers in the mass-transit vehicle. Accordingly, a device must be provided to restrain the wheelchair from moving within the interior of the vehicle.

Prior attempts to construct such devices are disclosed in Downing et al U.S. Pat. No. 4,062,209 and in Barecki U.S. Pat. No. 4,113,270. However, these prior art devices have been relatively complicated, expensive to manufacture or unsightly, or they have occupied too much space.

SUMMARY OF THE INVENTION

A wheelchair restraint in accordance with the present invention is relatively simple in operation, compact, aesthetically pleasing and not inordinately expensive. Essentially, the restraint comprises a bracket mounted adjacent the bottom of a folding seat, e.g. on a support for the seat. In use, the seat is folded to a raised position which allows a wheelchair to be backed into the restraint for engagement by the latter.

The bracket includes a pair of spaced arms for receiving a wheel therebetween. Located on the bracket, between its arms, are a pair of jaws mounted for pivotal movement between (1) an open position in which the wheel is free to move into or out of a received position between the arms and (2) a closed position in which the jaws restrain the wheel from moving into or out of its received position.

The jaws are normally urged to their open position. A latch element is mounted on the bracket for movement between a first position, for latching the jaws when the latter are in their closed position, and an unlatching second position. The latch element is normally maintained in its unlatching second position when the jaws are open. However, as the jaws move from their open to their closed position, the latch element is urged from its unlatching second position to its latching first position. The jaws ar moved from their open to their closed position in response to the movement of a wheel into a received position between the arms of the bracket. The latch element may be manually unlatched, permitting the jaws to open in accordance with their normal urging, thereby permitting the wheel to move out of the received position.

Other features and advantages are inherent in the structure claimed and disclosed or will become apparent to those skilled in the art from the following detailed description in conjunction with the accompanying diagrammatic drawings.

DETAILED DESCRIPTION

Figure 1:
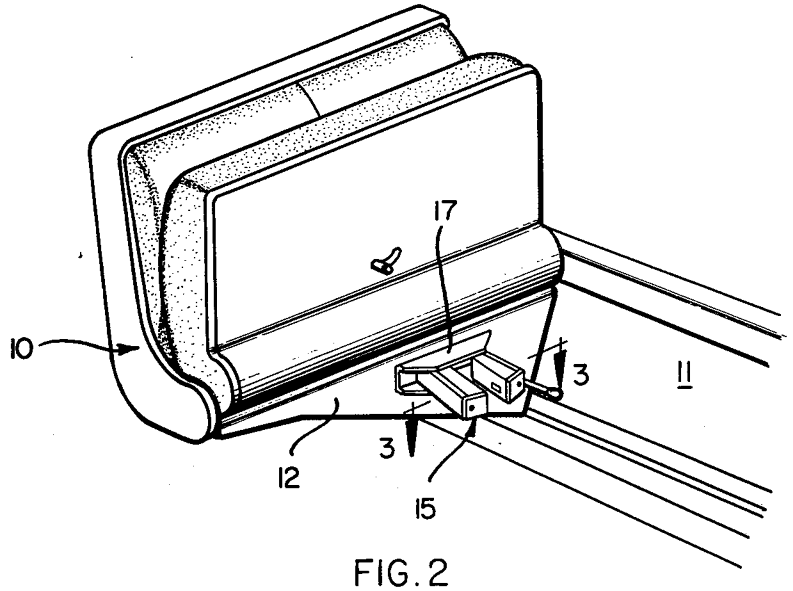
FIG. 1 is a perspective of a mass-transit vehicle seat below which is mounted a wheelchair restraint in accordance with an embodiment of the present invention.

Referring initially to FIG. 1, indicated at 10 is a mass-transit vehicle seat mounted atop a cantilevered support 12 in turn mounted on a wall 11 of the mass-transit vehicle. Mounted on cantilevered support 12 is a wheelchair restraint 15 constructed in accordance with an embodiment of the present invention.

Figure 2:
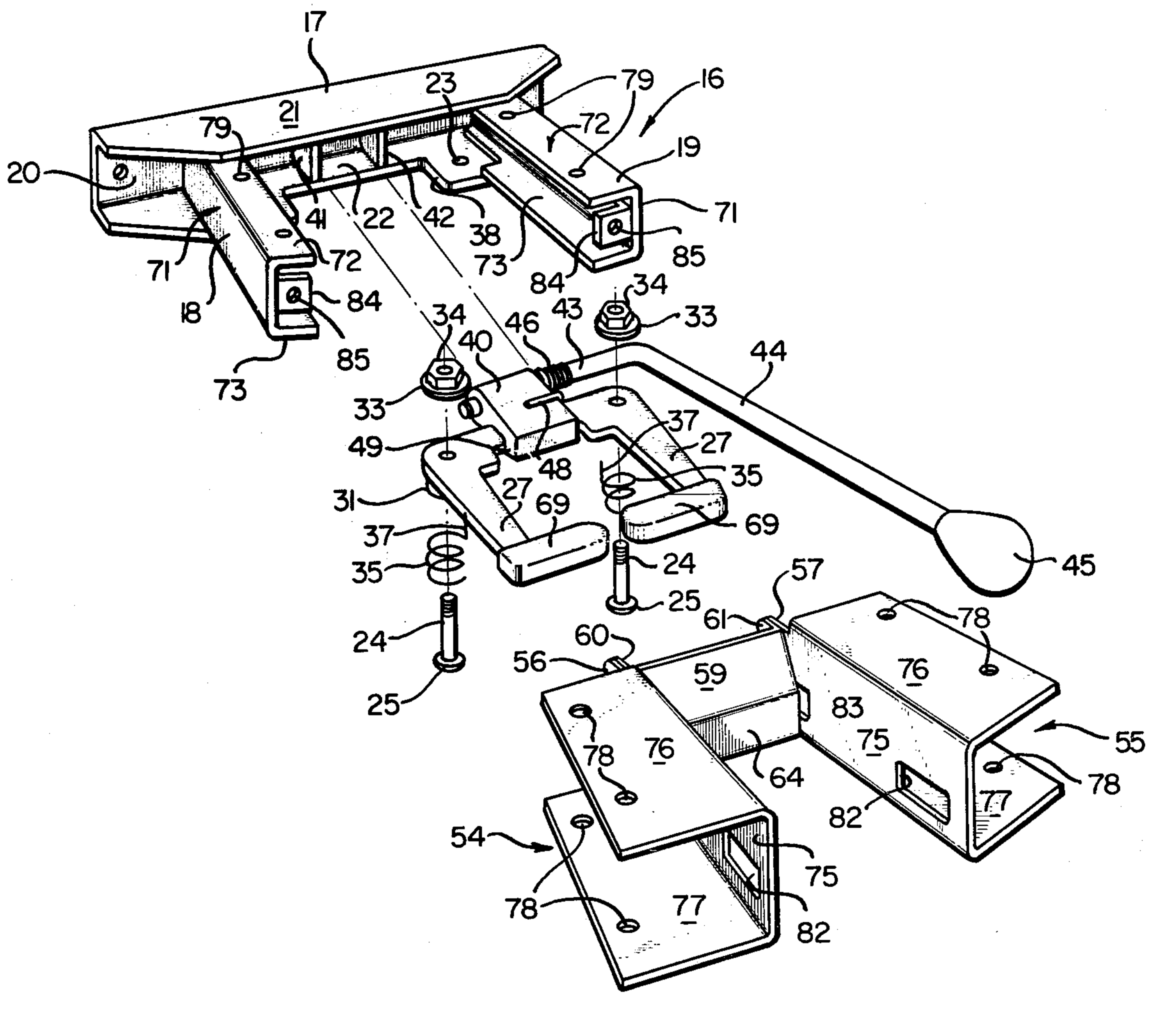
FIG. 2 is an exploded perspective of a wheelchair restraint in accordance with the present invention.
Figure 3:
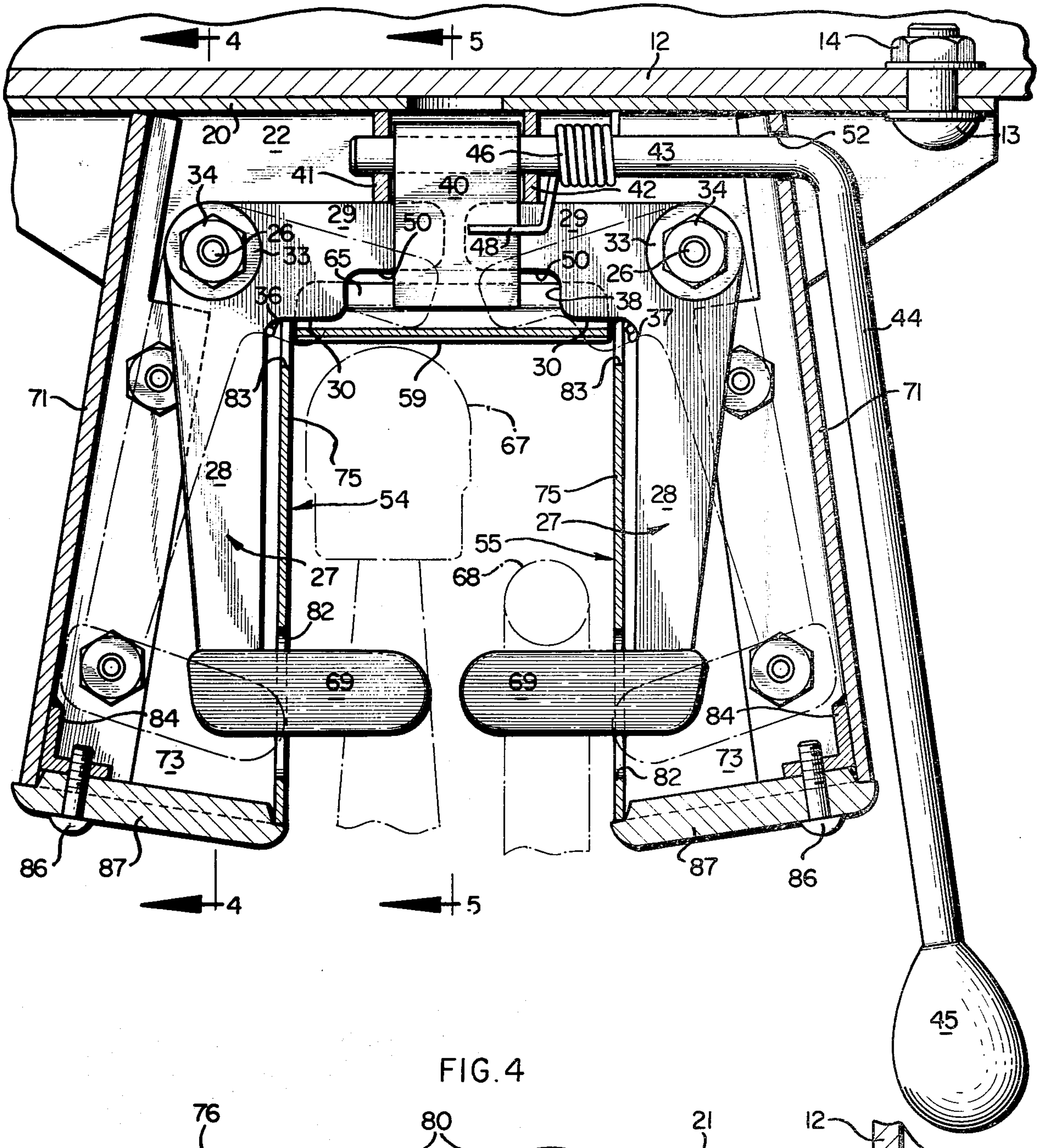
FIG. 3 is a horizontal sectional view taken along line 3—3 in FIG. 1.
Figure 4:
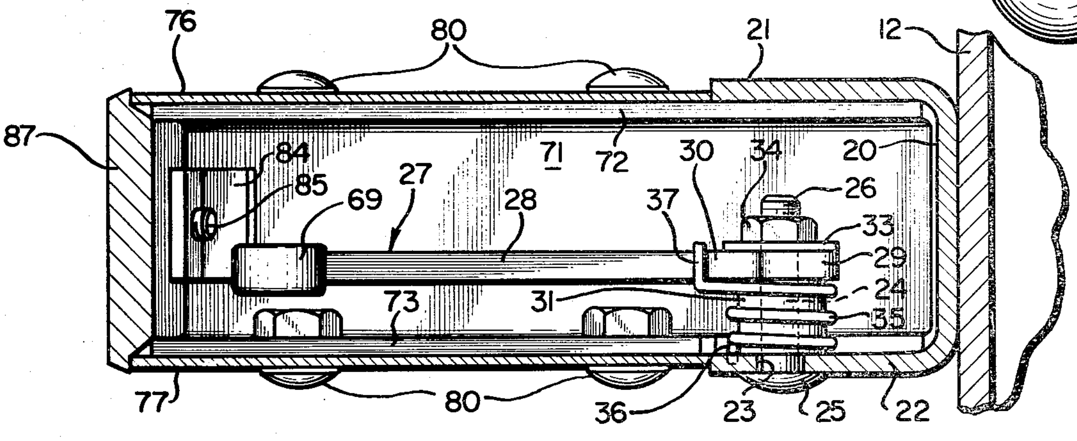
FIG. 4 is a vertical sectional view taken along line 4—4 in FIG. 3.

Referring to FIG. 2, restraint 15 comprises a bracket indicated generally at 16 and comprising a base portion 17 and a pair of arms 18, 19 each having a U-shaped cross section. Arms 18, 19 are spaced apart and extend from base portion 17. Referring to FIGS. 2–4, bracket base portion 17 comprises a web 20, a top-flange 21 and a bottom flange 22 cut away at 38. Bolts and nuts 13, 14 attach web 20 to cantilevered seat support 12 (FIG. 3).

Pivotally mounted on base portion 17 are a pair of jaws 27, 27, the details of which will now be described. Located in bottom flange 22 of bracket base portion 17 are a pair of spaced apart openings 23, 23, and extending through each opening 23, 23 is a mounting pin 24. Each mounting pin comprises a lower head portion 25 located beneath bottom flange 22 and an upper threaded portion 26. Each jaw 27 comprises a bushing portion 31 which receives pin 24 to mount the jaw for pivotal movement about the axis of the pin. Each jaw 27 comprises a first finger 28, extending outwardly from bracket base portion 17 and a second finger 29 disposed angularly to first finger 28 and extending along the bracket's base portion. Projecting from each second finger 29, adjacent its junction with first finger 28 is a shoulder 30.

Each jaw 27 is secured on its pivotal mounting pin 24 by a washer 33 and a nut 34 engaging the upper threaded portion 26 of pivotal mounting pin 24. As shown in FIGS. 2–4, located around each jaw's bushing portion 31 is a coil spring 35 having a first terminal part 36, which engages bottom flange 22 on bracket base portion 17, and a second terminal part 37 which engages first finger 28 of each jaw to urge the first fingers and the jaws to pivot outwardly, away from each other, to the open position shown in dash-dot lines in FIG. 3. The jaws are maintained in their closed position by a latch element 40 illustrated in FIGS. 2, 3, 5 and 6 and described in greater detail below.

Figure 9:
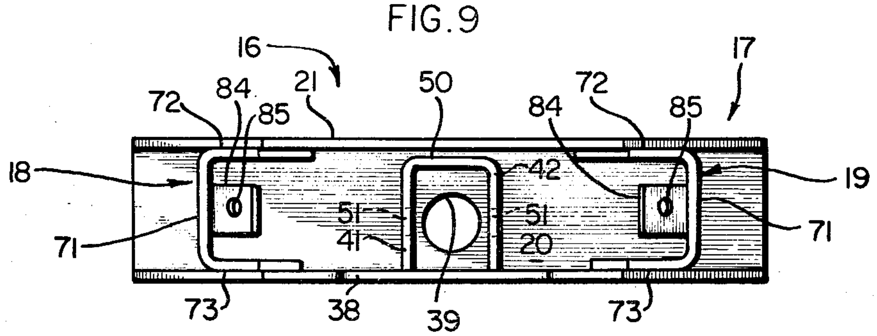
FIG. 9 is a front view of the bracket portion.

Located on bracket base portion 17 between top and bottom flange 21, 22 is a U-shaped element having a horizontally disposed top web 50 (FIG. 9) and a pair of vertically disposed horizontally spaced parallel walls 41, 42. Each vertical wall 41, 42 contains an axially aligned opening 51 through which extends a pivot shaft 43 on which is fixedly mounted latch element 40. Pivot shaft 43 is integral with a handle portion 44 extending forwardly relative to bracket 16 and terminating at a handgrip 45. Disposed around pivot shaft 43, adjacent latch element 40, is a coil spring 46 having a first terminal part 47 engaging against web 20 of bracket base portion 17 (FIG. 3) and a second terminal part 48 engaging the top of latch element 40 to urge the latch element downwardly about the pivotal axis of pivot shaft 43.

Figure 5:
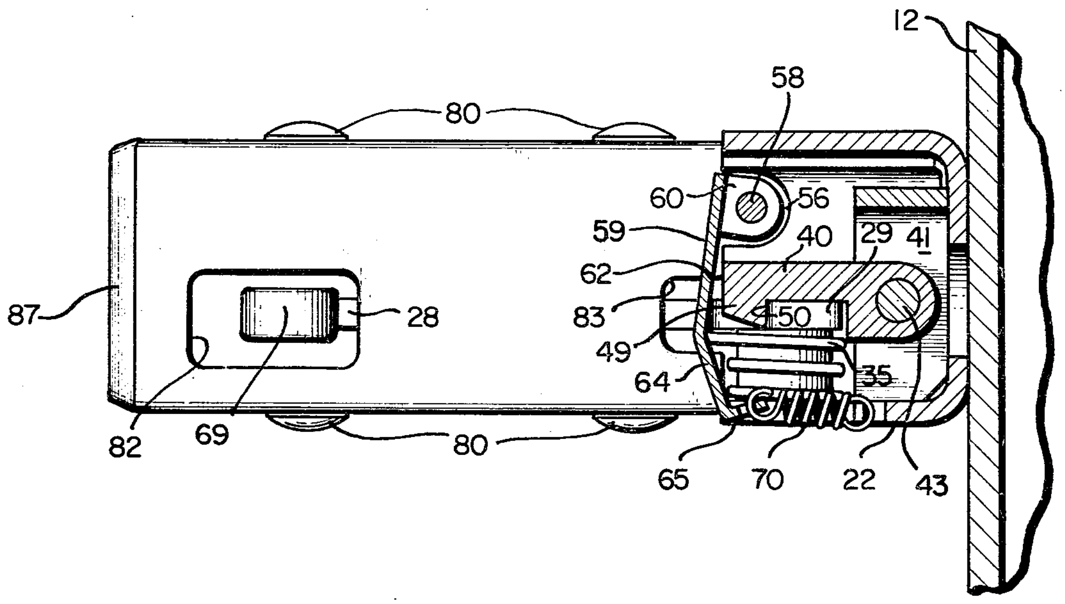
FIG. 5 is a vertical sectional view taken along line 5—5 in FIG. 3.
Figure 6:
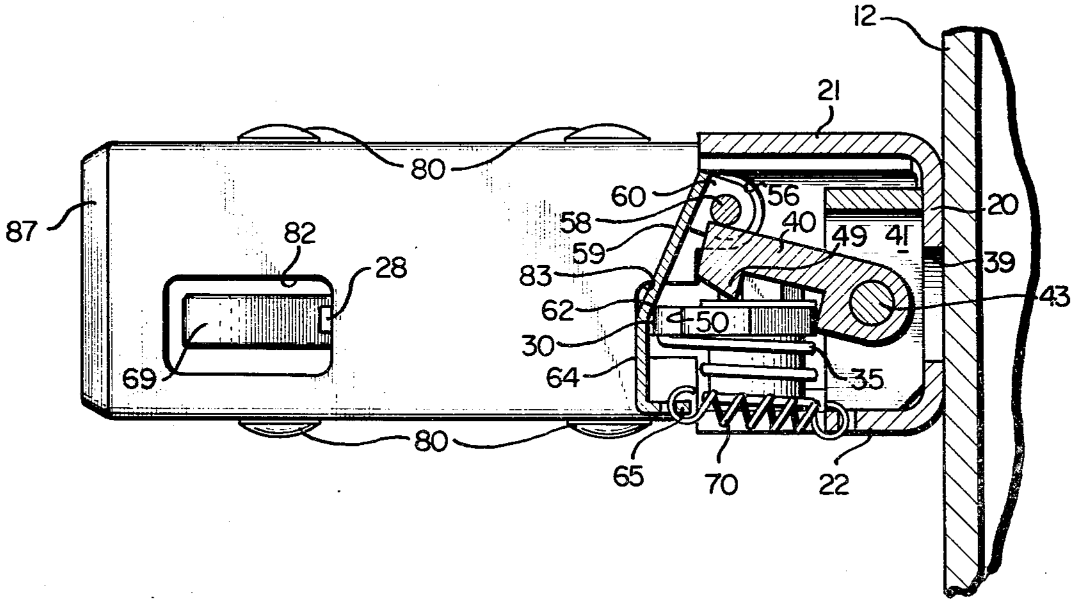
FIG. 6 is a vertical sectional view similar to FIG. 5.
Figure 7:
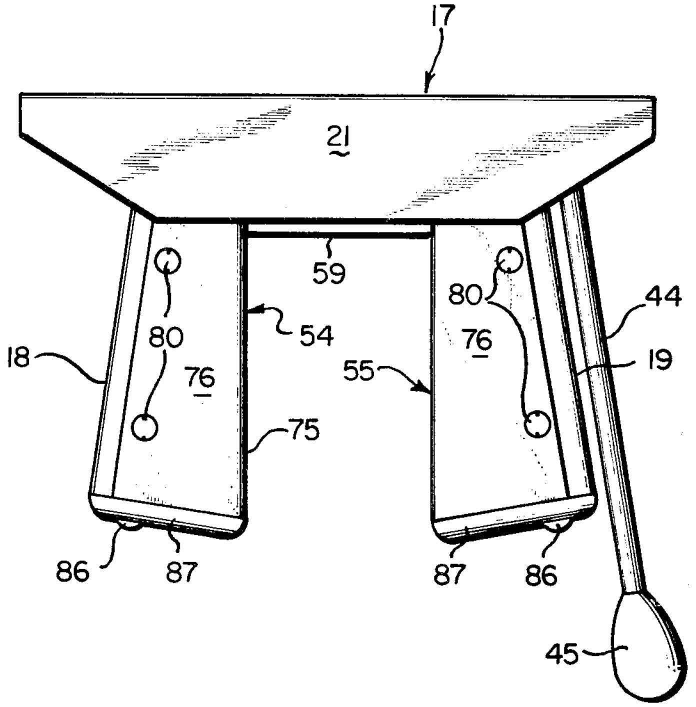
FIG. 7 is a plan view of the wheelchair restraint with the jaws in their open position.
Figure 8:
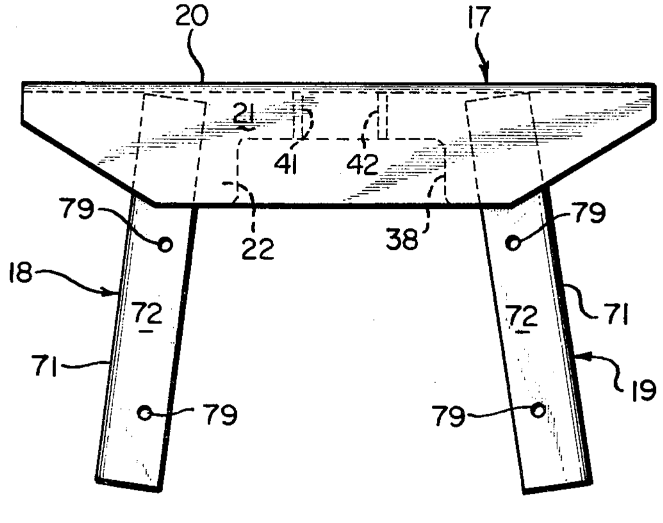
FIG. 8 is a plan view of the bracket portion of the restraint.

Referring to FIGS. 3 and 5–6, at the front part of latch element 40 is a depending portion 49, and, when jaws 27, 27 are in the closed position illustrated in full lines in FIG. 3, depending latch portion 49 engages the front edge 50 of second finger 29 on each jaw 27, to hold the jaws in their closed position. Latch element 40 is maintained in the latching position, illustrated in FIG. 5, by the urging of coil spring 46 (FIG. 3). Latch element 40 is unlatched by manually pivoting pivot shaft 43 in a clockwise sense, as viewed in FIG. 5, (i.e. upwardly). This pivots latch element 40 to the non-latching second position illustrated in FIG. 6 in turn causing jaws 27, 27 to be pivoted to their open position (dash-dot lines in FIG. 3) by the urging of coil springs 35 (FIG. 4) which normally maintain the jaws in their open position.

The jaws are closed by the operation of structure now to be described. Referring to FIGS. 2–3 and 5–6, mounted on respective bracket arms 18, 19 are housing portions 54, 55 (FIG. 2), the details of which will be subsequently described. Located at the back of each housing portion 54, 55 is an ear 56, 57, respectively, and mounted between ears 56, 57 is a shaft 58 on which a gate 59 is mounted for pivotal movement about the axis of shaft 58. Gate 59 comprises a pair of ears 60, 61 each located at a respective end of gate 59, at the top thereof, to mount gate 59 on pivot shaft 58.

When jaws 27, 27 are in their open position (dash-dot lines in FIG. 3), gate 59 engages the upper leading edge 62 of each shoulder 30 on the second finger of each jaw 27 (FIG. 6). Accordingly, if gate 59 is pushed inwardly so as to pivot about the axis of its pivot shaft 58 (in a counterclockwise sense as viewed in FIGS. 5 and 6), the engagement of gate 59 with shoulder 30 on each of the jaws 27, 27 would cause jaws 27, 27 to be pivoted against the urging of springs 35 to their closed position (full lines in FIG. 3). Such an inwardly pivoting action by gate 59 occurs when a wheelchair wheel enters the space between housing portion 54, 55.

More specifically, referring to FIG. 3, a wheelchair wheel is indicated diagrammatically in dash-dot lines at 67, and the handwheel of the wheelchair is indicated in dash-dot lines at 68. As the wheelchair wheel moves rearwardly into the space between housing portions 54, 55, it is guided by the housing portions toward the position indicated at 67. Gate 59 includes a lower portion 64 (FIGS. 2, 5 and 6), and, as the wheelchair wheel continues to move toward the position indicated at 67 it will eventually engage with and push against lower portion 64 on gate 59, thereby causing the gate to pivot inwardly about the pivotal axis of pivot shaft 58. This causes the gate to pivot from the disposition shown in FIG. 6 to the disposition shown in FIG. 5.

When gate 58 is in the disposition of FIG. 6, jaws 27, 27 are in their fully closed position (full lines in FIG. 3), and latch element 40 is holding the jaws in that position. When the jaws are in their fully closed position, they restrain the wheelchair wheel from moving out of the position illustrated in dash-dot lines at 67 in FIG. 3.

More specifically, each jaw 27, 27 includes an appendage or terminal portion 69 extending outwardly from the jaw's first finger 28. When jaws 27, 27 are in their closed position, an appendage 69 on one jaw extends between the spokes of the wheelchair wheel 67, in front of the rim of the wheel, and the other appendage 69 extends between the spokes of the handwheel 68, in front of the rim of the handwheel.

The wheelchair wheel 67 cannot be moved from its restrained position within the restraint 15 (FIG. 3) until jaws 27, 27 are moved to their open positions (dash-dot lines in FIG. 3) by operation of manually-operated handle 44. This can be accomplished by the occupant of the wheelchair grabbing handgrab 45 and lifting handle 44 upwardly, causing pivot shaft 46 to pivot latch element 40 to its non-latching position shown in FIG. 6, in turn causing jaws 27, 27 to pivot outwardly to their open position under the urging to coil springs 35, 35.

Extending inwardly from the bottom of gate lower portion 64 is a portion 65 to which is connected one end of a spring 70 the other end of which is connected to the bottom flange 22 of bracket base portion 17 (FIGS. 5–6). Spring 70 is an anti-rattle spring, and it is not strong enough to swing gate 59 inwardly against the normal outward urging of shoulders 30, 30 on jaws 27, 27. If rattling of gate 59 is not a problem, spring 70 can be eliminated.

Referring to FIGS. 2 and 3–7, there will now be described the details of housing portions 54, 55 and the manner in which these housing portions are mounted on side arms 18, 19 of bracket 16.

Each side arm 18, 19 has a U-shaped cross-section and comprises a web 71, a top flange 72 and a bottom flange 73. Similarly, each housing portion 54, 55 has a U-shaped cross-section and comprises a web 75, a top flange 76 and a bottom flange 77. Located in the top and bottom flanges 76, 77 of housing portions 54, 55 are a plurality of openings 78, 78 each aligned with a respective corresponding opening 79, 79 in one of the top and bottom flanges 72, 73 of bracket side arms 18, 19. The aligned openings 78, 79 receive fasteners 80 for attaching housing portions 54, 55 to bracket side arms 18, 19.

Located in the web 75 of each U-shaped housing 54, 55 is a slot 82 (FIGS. 2–3). Each slot 82 accommodates the passage of a respective jaw terminal portion 69 during movement of the jaws 27, 27 between their open and closed positions.

Located near the back end of each web 75 of housing portions 54, 55 is a cut-out 83 (FIGS. 2–3) to accommodate a respective shoulder 30 on the second finger 29 of a respective jaw 27 during movement of the jaws between their open and closed positions.

Located at the front end of each bracket side arm 18, 19 is a mounting clip 84 (FIGS. 2–3 and 9) containing a hole 85 for receiving a fastener 86 to mount a cap 87 at the end of each housing portion 54, 55. Located in web 71 of side arm 19 is an opening 52 through which extends pivot shaft 43 (FIG. 3).

The foregoing detailed description has been given for clearness of understanding only, and no unnecessary limitations should be understood therefrom, as modifications will be obvious to those skilled in the art.

I claim:

1. A wheel restraint comprising:

a bracket incuding a pair of spaced arms and comprising means for receiving a wheel between said arms;

a pair of jaw means;

means mounting said pair of jaw means on said bracket, between said arms, for pivotal movement between (1) an open position in which said wheel is free to move into or out of a received position between said arms and (2) a closed position in which said wheel is restrained from moving into or out of said received position;

means normally urging said pair of jaw means toward said open position;

a latch element;

means mounting said latch element on said bracket for movement between a first position, for latching said pair of jaw means when the latter is in said closed position thereof, and an unlatching second position;

means on said pair of jaw means for maintaining said latch element in its unlatching second position when the jaw means is in the open position thereof;

means for urging said latch element to its first position in response to movement of said pair of jaw means from said open to said closed position;

jaw closing means, responsive to a wheel moving into said received position thereof, for moving said pair of jaw means from the open to the closed position;

and manually operable means connected to said latch element for moving said latch element from its latching first position to its unlatching second position.

2. A wheel restraint as recited in claim 1 wherein:

said bracket comprises a base portion, said spaced arms extending from said base portion;

said pivotal mounting means for said pair of jaw means being located on said base portion of the bracket;

and said mounting means for said latch element being located on said base portion.

3. A wheel restraint as recited in claim 2 wherein:

each of said pair of jaw means comprises a first finger extending outwardly from said base portion of the bracket and a second finger disposed angularly to said first finger and extending along the base portion of the bracket; and said mounting means for the latch element comprises means movably mounting the latch element on said base portion to engage the second finger of both of said jaw means when the latter is in said closed position thereof.

4. A wheel restraint as recited in claim 3 wherein:

each of said second fingers includes shoulder means projecting outwardly toward the space between said bracket arms in which said wheel is received;

said jaw closing means comprises gate means, disposed in said space between the bracket arms for engagement by a wheel moving into its received position, said gate means being engageable with both of said shoulder means;

said jaw closing means further comprising means mounting said gate means for swinging movement inwardly against said shoulder means in response to movement of said wheel into said received position.

5. A wheel restraint as recited in claim 2 wherein:

each of said pair of jaw means comprises a first finger extending outwardly from said base portion of the bracket and a second finger disposed angularly to said first finger and extending along the base portion of the bracket;

each of said first fingers having a terminal portion extending towards the first finger on the other jaw means;

a pair of housings each mounted on a respective arm of the bracket for enclosing a respective first finger;

and a slot in each housing for passage of a respective one of said terminal portions during movement of the jaw means between its open and closed positions.

6. A wheel restraint as recited in claim 5 wherein:

said housing comprise means for guiding said wheel into said received position.

* * * * *